United States Patent

Kunstadt

[15] 3,648,263

[45] Mar. 7, 1972

[54] DATA HEAD ACTUATION APPARATUS AND CIRCUIT

[72] Inventor: George H. Kunstadt, 19005 Ventura Blvd., Tarzana, Calif. 91356

[22] Filed: May 11, 1970

[21] Appl. No.: 35,985

[52] U.S. Cl. ..................................340/174.1 E, 179/100.2 P

[51] Int. Cl. ..........................................................G11b 21/04

[58] Field of Search ..............................340/174.1 E, 174.1 F; 179/100.2 P

[56] References Cited

UNITED STATES PATENTS

| | | | |
|---|---|---|---|
| 3,177,495 | 4/1965 | Felts | 340/174.1 E |
| 3,005,676 | 10/1961 | Best et al. | 340/174.1 E |
| 3,069,667 | 12/1962 | Doody | 340/174.1 E |

*Primary Examiner*—Stanley M. Urynowicz, Jr.
*Attorney*—Allan M. Shapiro

[57] ABSTRACT

Magnetic discs and drums are employed as computer memories and have data heads aerodynamically supported on the boundary air layer as the memory medium rotates. The data heads are mounted on leaf springs and are lifted from the magnetic surface when the magnetic medium is stopped. The data heads are driven toward the surface into an aerodynamic lift relationship adjacent the moving magnetic surface as the surface approaches top speed. The data head driver is a solenoid which receives increased energization in the last stages of magnetic medium drive motor speed increase.

12 Claims, 5 Drawing Figures

Patented March 7, 1972 3,648,263

2 Sheets-Sheet 1

INVENTOR
GEORGE H. KUNSTADT
BY Allan M. Shapiro
ATTORNEY

Patented March 7, 1972 3,648,263

2 Sheets-Sheet 2

INVENTOR
GEORGE H. KUNSTADT
BY Allan M. Shapiro
ATTORNEY

DATA HEAD ACTUATION APPARATUS AND CIRCUIT

BACKGROUND OF THE INVENTION

1. Field of the Invention

This invention is directed to a data head actuation apparatus and circuit, particularly for the driving of "flying" data heads into data exchange relationship with moving magnetic storage discs or drums, and including a circuit for increasing energization to the head-positioning drive means as the magnetic medium reaches top speed.

2. Description of the Prior Art

One type of memory system commonly used with digital computers employs a rotating disc or drum which carries a thin magnetizable surface coating. The memory device continuously rotates during employment of the computer, and data heads are mounted adjacent the surface coating in such a way as to be able to "write" and "read" (record and playback) digital information on the magnetizable coating. The number of bits that can be recorded and later read out per circumferential inch of track increases substantially as the distance between the data head and the coating decreases.

A commonly employed method of maintaining a very small distance between the data head and the coating employs the principle of an air-lubricated slider bearing. A data head is mounted so as to be mechanically free to make contact with the coating or even urged into such contact; a thin boundary layer of air moves with the surface as the surface rotates, and the data head is spaced from the magnetic surface by being aerodynamically supported by this relatively moving layer of surface air so that the head effectively "flies." However, the aerodynamic lift is only available when the rotating device is very nearly up to full speed. Therefore, in the prior equipment, during starting and stopping, undesirable physical contact would occur between the magnetic surface and the data head.

To overcome this problem, a head-lifting-and-lowering mechanism has been applied, which mechanism satisfactorily raises the data head the moment motor power is shut off; however, during motor startup, the speed of mechanism actuation must be sufficiently slow to permit the data head to find its own aerodynamic flight attitude as it slowly lowered to the surface. Two previously used devices for head-lifting-and-lowering include mechanical cams and pneumatic drives. Both of these devices were quite expensive.

An electromagnetic solenoid is a generally suitable source of mechanism power, but has previously been unsuccessful because of the force versus travel characteristics of solenoids tend to produce forces which cause the data head to engage upon the magnetic surface.

SUMMARY OF THE INVENTION

In order to aid in the understanding of this invention, it can be stated in essentially summary form that it is directed to a data head actuation apparatus and circuit therefor. The data head apparatus comprises the mounting of a data head on a resilient member for movement toward and away from a relatively movable magnetic surface, including a magnetic medium drive motor to relatively drive the magnetic surface with respect to the data head. The data head is mounted to ride adjacent the magnetic surface separated therefrom by aerodynamic lift, when the surface is relatively moving with respect to the data head. A solenoid engages the resilient member to move the data head toward the magnetic surface when the magnetic surface is relatively moving, such data head movement being performed in two phases, namely, initial motion toward the magnetic surface so as to be close enough thereto to receive aerodynamic lift and achieve a flight attitude as the magnetic medium comes up to speed, and then a final position-setting motion for maximum effectivity, such final motion being interrelated with the maximum medium speed. In the preferred embodiment, two-phase energization for the solenoid is controlled by the motor characteristics of the magnetic medium drive motor.

Accordingly, it is an object of this invention to provide improved means for driving a data head into aerodynamic lift relationship to a relatively moving magnetic surface. Another object is to provide a circuit for controlling a solenoid for causing the data head to approach the moving magnetic surface at a proper rate to permit aerodynamic lift to prevent physical contact. It is another object to automatically control the operating current of the solenoid in such a way as to automatically control data head motion toward the magnetic surface in two phases for achieving flight first and then set. It is another object to provide a circuit for energizing the solenoid which first supplies a weak current and later supplies more current to the solenoid coil so that the solenoid armature travel is related to the aerodynamic condition of the data head. It is still another object to provide solenoid control by supplying solenoid current from a point in the drive motor circuitry which is responsive to drive motor and magnetic surface speed. It is a further object to effectively measure the position of the data head and to control the current to the solenoid as a function of data head position and drive motor speed.

The features of the present invention which are believed to be novel are set forth with particularity in the appended claims. The present invention, both as to its organization and manner of operation, together with further objects and advantages thereof, may be understood best by reference to the following description, taken in connection with the accompanying drawings.

DESCRIPTION OF THE PREFERRED EMBODIMENT

Figure 5:
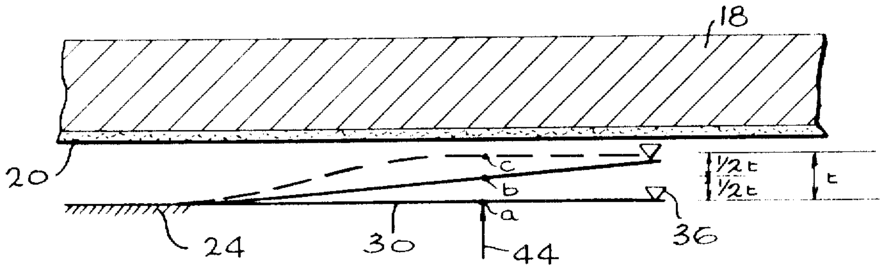
FIG. 5 is a fragmentary vertical section, primarily diagrammatic, which illustrates the spring profile under different condition.

The data head actuation apparatus and circuit of this invention is for a magnetic memory device wherein a rotating structure has information recorded thereon in magnetic form, with subsequent readout as required. As described above, the magnetic memory device can have a magnetic surface on either the circumference of a drum or the face of a disc. The invention is illustrated in the drawings with respect to a magnetic disc memory. Furthermore, the apparatus is illustrated and described only in connection with one surface of the disc, it being noted that normally the opposite surface of the disc is provided with duplicate apparatus in substantially mirror relationship.

Frame member 10 supports a bearing 12 in which is rotatably mounted shaft 14. Shaft 14 is rotatably driven by rotary motor 16, see FIGS. 1 and 4. Disc 18 is mounted on shaft 14 and has magnetizable material 20, see FIG. 5, on at least one face thereof. In the present instance, the lower face is shown as having a surface coating 20 of magnetizable material thereon. Thus, as the motor and the disc rotate, the magnetizable material on the disc moves relative to frame member 10.

Figure 1:
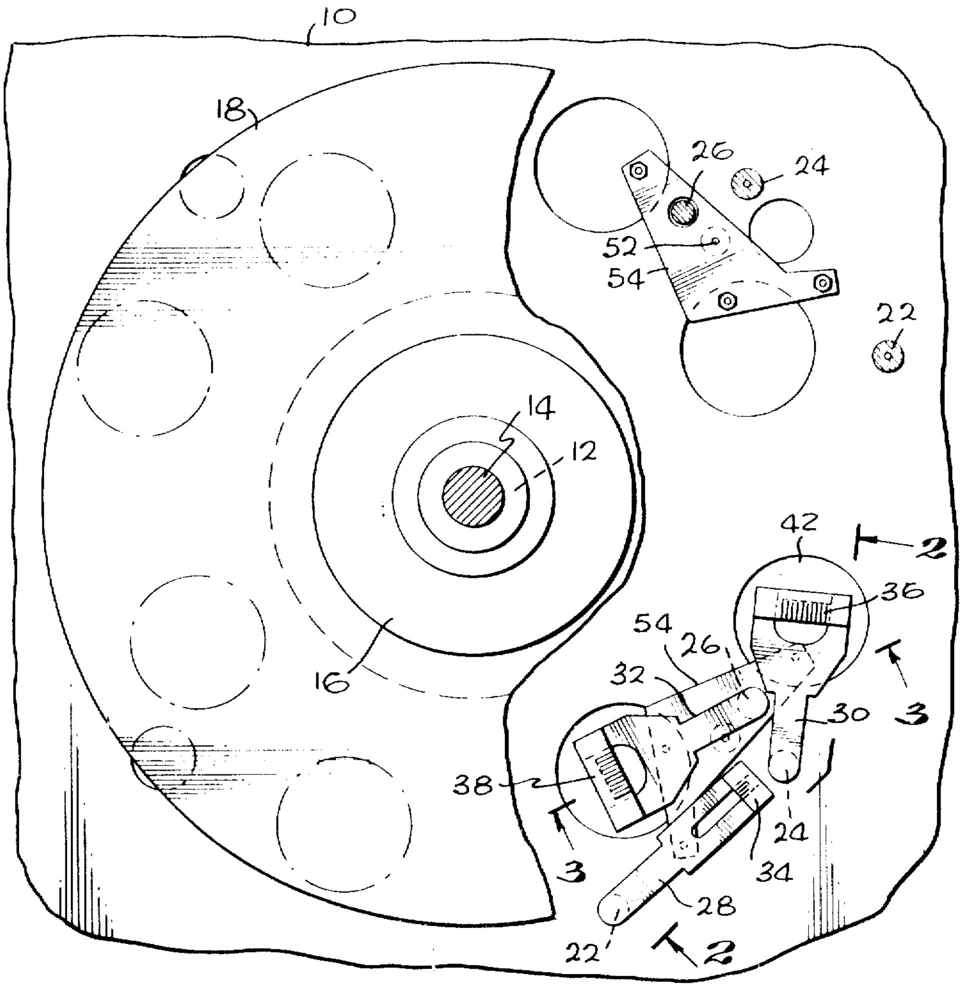
FIG. 1 is a fragmentary plan view, partly broken away, of the data head actuation apparatus of this invention, in conjunction with magnetic disc memory equipment.
Figure 2:
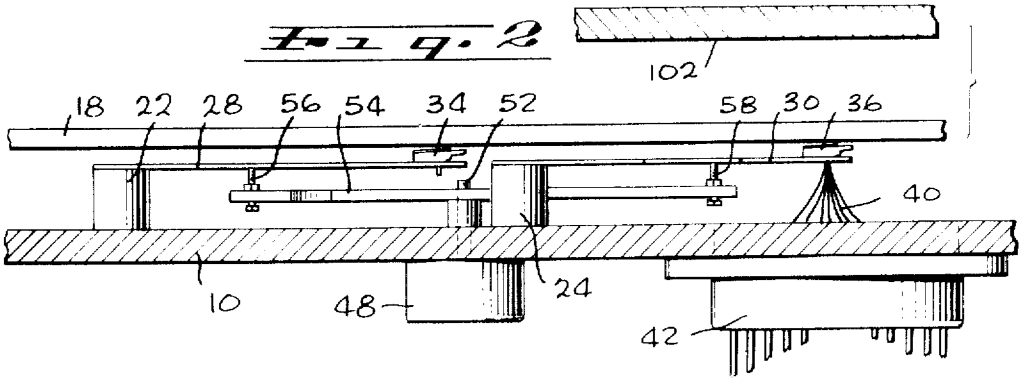
FIG. 2 is an enlarged fragmentary vertical section, partly in elevation, taken substantially along the line 2—2 of FIG. 1.
Figure 3:
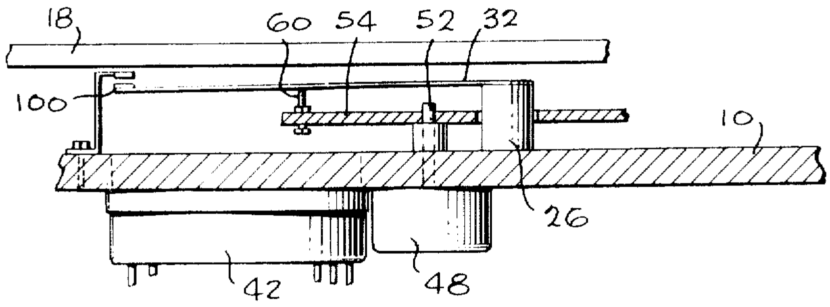
FIG. 3 is another enlarged fragmentary vertical section, partly in elevation, taken substantially as though along the line 3—3 of FIG. 1 but showing a circuit switch arrangement.

FIGS. 1, 2 and 3 illustrate posts 22, 24, 26, which are mounted on the top surface of frame member 10 and respectively carry leaf springs 28, 30 and 32. Mounted upon the bifurcated ends of these leaf springs are respective data heads 34, 36 and 38. The data heads are conventionally sufficiently loosely pivotally mounted on their respective leaf springs so that they can each independently seek the optimum aerodynamic angle of attack on the boundary layer of air on the disc 18. The data head mounting upon its spring is such that each data head follows the same path as the disc rotates relative to the data head.

Conventionally, there are a plurality of magnetic gaps, each with its coil on each of the data heads so that each of the data heads is effective in recording and reading a plurality of tracks. Thus, the number of data channels on the magnetic disc is equal to the number of data heads. Other magnetic sensing means such as wound cores can alternatively be employed. This multiplies the number of information channels which can be independently employed well beyond the number of data heads employed. Thus, for the purpose of this description, the data head is that mechanical structure mounted upon the end of the leaf spring, independently of the number of magnetic gaps or other sensors thereon and, thus, independently of the number of independent recording and readout channels in its mode of operation.

As is seen in FIG. 1, the data heads 36 and 38 may be wider than the data head 34 and, in normal circumstances, the data heads 36 and 38 thus are capable of operating in conjunction with more channels than the data head 34. Output from the coils in association with the magnetic gaps is accomplished by cabling 40 (see FIG. 2) with connects those coils with equipment such as connector 42 which, in turn, connects the signal lines to appropriate input and output electronics. If desired, diodes or other electronic elements can be associated with the fixed part of connector 42 mounted upon frame member 10.

As previously described, data head 36 is mounted on the end of leaf spring 30. This mounting is characteristic of all of the mountings and will be described in more detail. The leaf spring 30 in the unstressed position is such as to maintain data head 36 away from the magnetizable surface 20 of disc 18. In FIG. 5, the unstressed position is shown at "*a*." To move the data head into data transfer position with the magnetizable surface 20 of disc 18, mechanical flexure force is applied to the spring 30, as at arrow 44, to resiliently bend the spring. At an intermediate force level, the spring is bent to the position "*b*," where the data head 36 experiences aerodynamic lift from the boundary layer of air moving with the rotating disc 18. Finally, the spring is further stressed by force generally along arrow 44 to the position "*c*," where the spring receives the illustrated reverse bend. This reverse bend is not necessary to hold the data head at the proper angle, for it conventionally achieves its proper angle from the aerodynamic lift and the relative freedom of pivotal mounting which, in this invention, is on the spring 30. However, the spring stress illustrated by the position *c* of the spring is such as to minimize spacing of the data head 36 from the surface 20 by applying substantially the maximum amount of force on the data head 36 that the aerodynamic lift, with the thinnest amount of boundary layer, can overcome. Thus, stressing the spring to position *c* achieves the minimum spacing of the data head 36 from the surface 20 of the disc 18, while still maintaining sufficient air boundary layer therebetween to prevent actual mechanical contact. This close relationship permits the highest transfer rates of the greatest amount of data heretofore attainable, without the mechanical contact disadvantages of the prior art, the means and methods for attaining such desirable performance being further described hereinbelow.

Furthermore, as seen from FIG. 5, the first half of the travel *t* of the spring actuator, which engages at the point illustrated by arrow 44, is taken up with moving the data head from its spaced position to a point where it first receives significant aerodynamic lift from the boundary layer on the disc. The second half of the travel *t* of the spring actuator is principally directed to spring deflection with a minimum amount of data head movement toward the disc, because the amount of aerodynamic lift becomes significantly greater in the last small increments of motion of the data head toward the disc. It will be understood that the dimensional and mathematical proportions shown in FIG. 5 are exaggerated for convenience of illustration and description. For example, the distance of actuator travel may be ¾ *t* and then ¼ *t*, or otherwise, depending on such parameters as spring length, distance between spring end post 24 and surface 20, overall distance *t*, point of application of the actuator, and so forth. The proper amount of motion by a spring actuator, and the manner in which the rate and distance of travel of the data head are controlled, are described below.

Solenoid housing 48 contains a solenoid coil and a movable solenoid armature. The coil is illustrated at 50 in FIG. 4 and the solenoid plunger at 52 in FIGS. 2 and 3, plunger 52 being an outward extension of the solenoid's armature. The solenoid is arranged so that solenoid plunger 52 moves upward in FIGS. 2 and 3 when the solenoid coil is energized to act as a linear motor. Mounted upon plunger 52 is solenoid-operated driving plate 54. Driving plate 54 has a plurality of screws therein, shown at 56, 58 and 60, which respectively engage springs 28, 30 and 32. Each of the screws is an adjustable drive finger or actuator which acts instead of the schematic arrow 44 shown in FIG. 5. Adjustment of the screws causes each of the three data heads to move into the same respective relationship to the rotating disc, and management of energization of solenoid coil 50 causes the proper speed of actuation of the solenoid-actuated driving plate 54 to permit the data heads to move into aerodynamic relationship to the boundary layer without having sufficient inertial energy to drive them through the boundary layer into mechanical contact.

Figure 4:
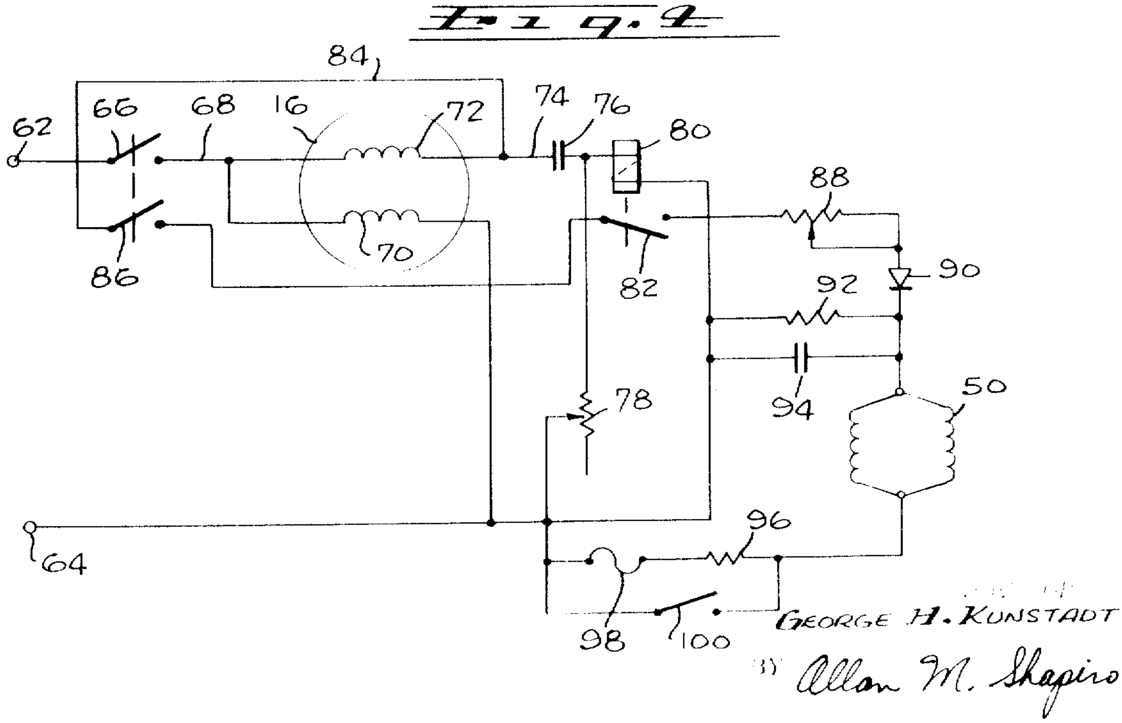
FIG. 4 is a schematic diagram of a circuit in accordance with this invention.

Solenoid coil energization is accomplished by the circuit of FIG. 4, the same reference numerals being used therein as are applied to their corresponding elements in the other figures. Conventional AC power is supplied to terminals 62 and 64. Power switch 66 is closed when energization of motor 16 and rotation of the disc is desired. Closure of switch 66 connects motor line 68 to power terminal 62. Motor line 68 is connected through main motor winding 70 to power terminal 64. Motor line 68 is also connected to the end of auxiliary winding 72 which has its other end connected by line 74 to capacitor 76. The other side of capacitor 76 is connected to terminal 64 by parallel paths through variable resistor 78 and relay coil 80. The current in capacitor 76 thus is divided between resistor 78 and relay coil 80 so that adjustment of the variable resistor 78 regulates the current level at which relay coil 80 is energized to a sufficient extent to close its normally open contact 82. For example, variable resistor 78 is adjusted so that relay coil 80 is energized to a sufficient extent to close contact 82 when motor 16 reaches about 80 percent of its full speed. It should be noted that, for the purposes of this invention, a preferred motor is a single phase induction motor, or hysteresis synchronous motor, having a motor capacitor 76 in series with the auxiliary winding 72, as illustrated; in this type of motor, the characteristics of current versus motor speed are such that, as speed increases from 0 to running speed, the current in the main winding 70 decreases while the current in the auxiliary winding 72 increases nonlinearly and sharply from about 80 percent of full speed to about 95 percent of full speed, thus producing a correspondingly increasing voltage across capacitor 76 having at least one characteristic "knee." The present invention advantageously employs the motor characteristics by virtue of utilization of the capacitor voltage as the effective power supply for the solenoids' operating circuit.

Line 84 is connected to line 74 between auxiliary winding 72 and capacitor 76. Line 84 is connected through switch 86 which is ganged with switch 66 to normally open contact 82. The other side of normally open contact 82 is connected through potentiometer 88 to diode 90. The other side of diode 90 is connected to terminal 64 through parallel resistance 92 and capacitor 94. Diode 90 is also connected to the solenoid coil 50 which is in parallel (or series, or combined series-parallel) to all of the solenoid coils as indicated. Solenoid coil 50 is connected to terminal 64 through serially connected resistor 96 and fuse 98. Resistor 96 and fuse 98 are paralleled by switch 100. This circuit is arranged so that the solenoid plunger moves at the proper speed and with the proper force, as described below.

Upon closure of switches 66 and 86, motor 16 is energized by having both its main winding 70 and its auxiliary winding 72 connected to the line terminals. As motor speed increases, the current in main coil 70 decreases while the current in auxiliary coil 72 increases so that voltage builds up across capacitor 76 and current increases through coil 80. As previously described, when the motor speed reaches the predetermined value, for example 80 percent of maximum speed, as established by the setting of variable resistor 78, relay coil 80 closes normally open contact 82. This connects line 74 to variable resistor or potentiometer 88. The voltage value in line 74 is still not at its maximum value and, thus, increases in motor speed will increase voltage to variable resistor 88 which is employed to adjust the maximum solenoid current.

The current out of resistor 88 is rectified at diode 90, and the half-wave rectified output of diode 90 is delayed in its rise by the large time constant introduced by the RC circuit of elements 88 and 94. This further delays the time rise of energization of solenoid coil 50. Thus, solenoid coil 50 is slowly energized with current which is also limited by the serially connected resistor 96. This energization causes motion of driving plate 54 and deflection of the springs, with the springs supplying the balancing force acting against the solenoid force. After aerodynamic engagement of the data heads, as aforesaid, thus completing the first phase of the operation, switch 100 is closed at about 95 percent of maximum motor speed at approximately point *b* in FIG. 5, to remove the resistance of resistor 96 from the circuit. When the motor reaches full speed there is sufficient solenoid power to finally apply the maximum force to the springs to balance the aerodynamic lift at the finally desired spacing. The time delays involved and the employment of reduced voltages, resulting from motor current characteristics on the solenoid coil, prevent the data heads and associated structure from accumulating sufficient inertia to cause physical contact. By this means, the data heads are brought into proper operating relationship after the disc is up to adequate speed. When motor 16 is deenergized by opening switches 66 and 86, solenoid 50 and its parallel solenoids are deenergized, causing immediate retraction of the data heads by the stress in the data head mounting springs.

Switch 100 of FIG. 4 conveniently may be a microswitch having its button lightly urged against the underside of any one of the springs and adjusted so that its contacts close when the spring movement has reached a point in relation to the other parameters where closure of switch 100 is desired, as described in connection with FIG. 4. FIG. 3 illustrates a case, as when sufficient data transfer capacity is attainable by the other data heads, where one of the data heads has been removed and a simple switch 100 arranged with the spring, as by disposing the first of a pair of switch contacts on the spring and the second contact thereabove, with the second contact being mounted on frame 10 via a bracket.

As has been described, and as is illustrated in the lower right of FIG. 1, one solenoid controls the leaf springs of three data heads. The management of the position and force on the springs is such that the data head springs can be directed either toward or away from the direction of disc rotation as is illustrated in the lower right of FIG. 1. Thus, data head arrangement can be made more convenient.

Connector 42 has been described with respect to data head 36. Each of the data heads has a similar connector which are illustrated as circles in FIG. 1. Thus, four sets of three data heads are illustrated in FIG. 1, there being one solenoid coil for each of the sets of data heads, as described with respect to FIGS. 2 and 3. The additional solenoid coils can be connected in parallel to solenoid coil 50 as is illustrated in FIG. 4, or can be serially or series-parallel connected depending on ratings. Additionally, both sides of disc 18 can carry magnetizable material thereon and have data heads operating with respect thereto. Thus, frame member 102 is illustrated as a fragment in FIG. 2, this frame member being able to carry all of the equipment carried by frame member 10, thus providing duplicate equipment upon the other side of the rotating disc.

Furthermore, it is clear that the operating structure can be employed conveniently and effectively with respect to a magnetic memory drum, although the preferred embodiment is illustrated in connection with a magnetic memory disc because of the even greater problems of head actuation in association with discs which are solved by the present invention.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. Data head actuation apparatus comprising:
   - a frame;
   - a magnetic memory device rotatably mounted on said frame and having a magnetizable surface;
   - a rotary motor mounted on said frame and connected to said memory device for rotating said memory device at a running speed to create an air boundary layer at said surface, said rotary motor including an unimpeded main motor winding and a starting winding, the voltage drop across said starting winding being a function of motor speed, phase shifter means connected in series with said starting winding for shifting the current phase in said starting winding with respect to the main winding;
   - magnetic data head means including at least one data head having aerodynamic lift characteristics and mounted for movement toward and away from said surface into and out of said boundary layer; and
   - actuator means mounted on said frame in driving relationship to said data head means for causing data head movement, said actuator means being serially connected to said starting winding and responsive to said voltage drop across said starting winding for causing said actuator means to urge said data head toward said surface.
2. The apparatus of claim 1 wherein:
   - said actuator means comprises a solenoid having a coil and an armature plunger, said plunger being in driving relationship to said data head means, said coil being connected to said motor circuit means.
3. The apparatus of claim 2 wherein said actuator means includes:
   - a driving plate mounted on said armature plunger; and
   - and adjustment screw mounted on said driving plate, said adjustment screw being in driving engagement with said data head means.
4. The apparatus of claim 3 wherein said data head means comprises:
   - a spring having first and second ends, said first end being mounted on said frame, said data head being mounted on said second end, said adjustment screw being in abutment engagement with said spring intermediate said ends for causing resilient deflection of said spring whereby said data head is moved toward said surface.
5. The apparatus of claim 4 including:
   - a plurality of said springs, each of said springs carrying said data head; and
   - a corresponding plurality of said adjustment screws mounted on said driving plate and in engagement with respective said springs so that, upon solenoid actuation, said plurality of springs is deflected and such plurality of data heads is urged toward said surface.
6. The apparatus of claim 1 wherein:
   - said phase shifter means comprises a capacitor serially connected with said starting winding; and
   - said actuator means comprises a solenoid having a coil and an armature plunger, said plunger being in driving relationship to said data head means, said solenoid coil being connected in series with said auxiliary winding and in parallel with said capacitor so that said solenoid is responsive to said voltage.
7. The apparatus of claim 6 wherein:

a relay having a relay coil is connected in series with said starting winding and said capacitor so that said starting winding is serially unimpeded, except for said relay coil and said capacitor, said relay having normally open contacts in series with said solenoid coil, said relay being operable to close said contacts for operative connection of said solenoid coil to said circuit means when the speed of said motor is sufficient to cause aerodynamic flight of said data head.

8. The apparatus of claim 7 wherein said motor circuit means comprises:

a diode and a resistor in series with said solenoid coil; and a capacitor in parallel with said solenoid coil, said resistor and said capacitor having sufficient time constant to delay full energization of said solenoid coil.

9. The apparatus of claim 8 wherein said actuator means includes:

a driving plate mounted on said armature plunger; and an adjustment screw mounted on said driving plate, said adjustment screw being in driving engagement with said data head means.

10. The apparatus of claim 9 wherein said data head means comprises:

a spring having first and second ends, said first end being mounted on said frame, said data head being mounted on said second end, said adjustment screw being in abutment engagement with said spring intermediate said ends for causing resilient deflection of said spring whereby said data head is moved toward said surface.

11. The apparatus of claim 10 including:

a plurality of said springs, each of said springs carrying said data head; and a corresponding plurality of said adjustment screws mounted on said driving plate and in engagement with respective said springs so that, upon solenoid actuation, said plurality of springs is deflected and such plurality of data heads is urged toward said surface.

12. The apparatus of claim 11 wherein:

a second resistance is connected in series with said solenoid coil; and a control switch is connected in parallel with said second resistance, said control switch being connected to be closed when said data head approaches said surface to increase energization of said solenoid coil.

* * * * *